United States Patent

Fujimoto

[15] 3,641,901
[45] Feb. 15, 1972

[54] BEHIND-THE-LENS LEAF SHUTTER MECHANISM FOR USE WITH A SINGLE-LENS REFLEX CAMERA

[72] Inventor: Sakae Fujimoto, Tokyo, Japan
[73] Assignee: Kabushiki Kaisha Richoh, Tokyo, Japan
[22] Filed: Mar. 16, 1970
[21] Appl. No.: 18,796

[30] Foreign Application Priority Data
Nov. 10, 1966 Japan..................................41/73945

[52] U.S. Cl. ................................................................95/42
[51] Int. Cl. ......................................................G03b 19/12
[58] Field of Search ..................................95/42, 58, 62, 59

UNITED STATES PATENTS
3,185,058  5/1965  Singer.......................................95/42

Primary Examiner—Samuel S. Matthews
Assistant Examiner—Richard L. Moses
Attorney—Burgess, Ryan & Hicks

[57] ABSTRACT

A single-lens reflex camera body adapted to receive any one of a plurality of interchangeable lenses has a behind-the-lens leaf shutter with its blades positioned between the lens and a movable reflecting mirror. Operating mechanism for driving the shutter blades is distributed around the optical axis of the lens between the lens and the shutter blades and means are provided to deflect the movable mirror first out of the optical axis and then (after the image is recorded on the film) back to its original position.

3 Claims, 7 Drawing Figures

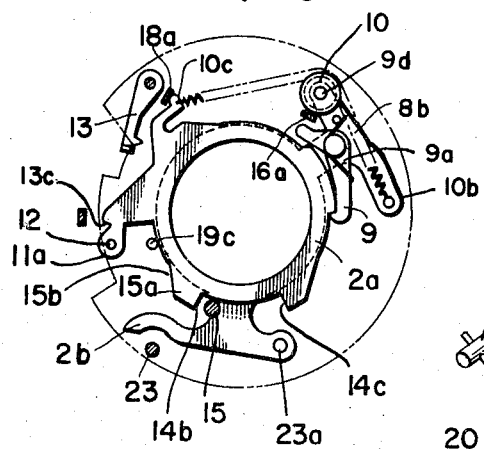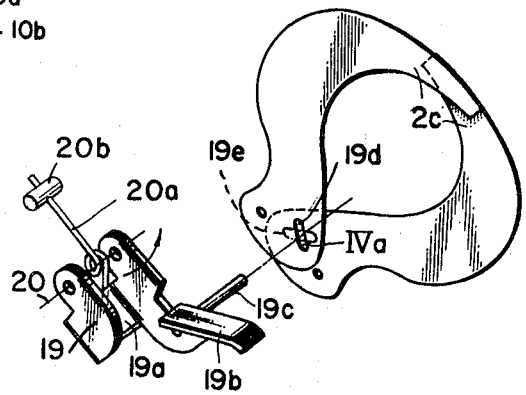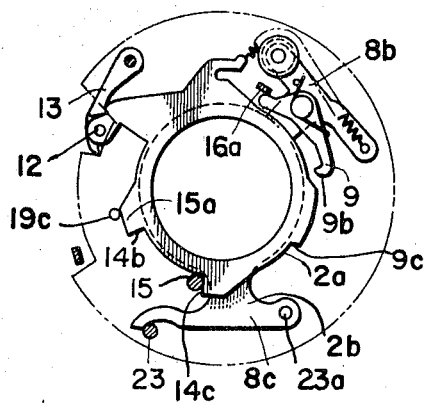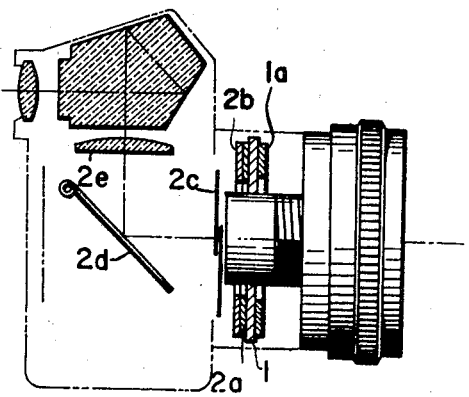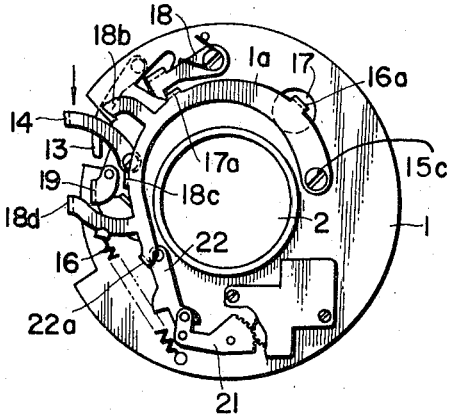

BEHIND-THE-LENS LEAF SHUTTER MECHANISM FOR USE WITH A SINGLE-LENS REFLEX CAMERA

This application is a continuation of U.S. Pat. application Ser. No. 679,388, filed Oct. 31, 1967, now abandoned.

BACKGROUND OF THE INVENTION

In a single-lens reflex camera incorporating what is known as a lens shutter built into a lens barrel, the designing of a shutter mechanism outside of the camera body and a movable reflecting mirror within the camera body such that both can be coupled mechanically with each other poses considerable technical problems. Furthermore, the so-called lens shutter is basically designed at the cost of interchangeability of lenses which is the greatest advantage of a single-lens reflex camera.

On the other hand, with other types of cameras, the interchangeability of lenses can be achieved by adopting a so-called "behind-the-lens shutter" in which a shutter mechanism is provided immediately behind a lens-mounting portion of the camera body.

It follows that the application of the behind-the-lens shutter to a single-lens reflex camera requires the provision of a movable reflecting mirror immediately behind a shutter mechanism. This, in turn, means that a mechanism connecting the mirror and the shutter mechanism must be designed within a reasonably short distance in the direction of the optical axis, as otherwise, mounting of the component elements becomes difficult by virtue of the dimensional restrictions of a lens back, which dimensions are determined by the design of the camera body. Therefore, to equip an interchangeable lens single-lens reflex camera with a lens shutter has never been commercially feasible.

The purpose of this invention is to overcome the above-mentioned difficulty and, with a relatively simple structure, to provide a single-lens reflex camera having a behind-the-lens shutter with lens interchangeability.

BRIEF DESCRIPTION OF THE ACCOMPANYING DRAWINGS

FIGS. 3 and 4 are end views of the elements shown in FIG. 2 illustrating their different relative positions in one mode of operation;

FIG. 5 is a front view of a portion of the elements shown in FIG. 1 mounted on the front surface of the baseplate 1, illustrating relative positions of each of said elements;

FIG. 6 is a perspective view of dissembled shutter blades and an arm-shaped member which opens and closes said shutter blades illustrating relative disposition of the shutter blades and the arm-shaped member; and FIG. 7 is a phantom side view of a single-lens reflex camera equipped with applicant's improvement.

Figure 1:
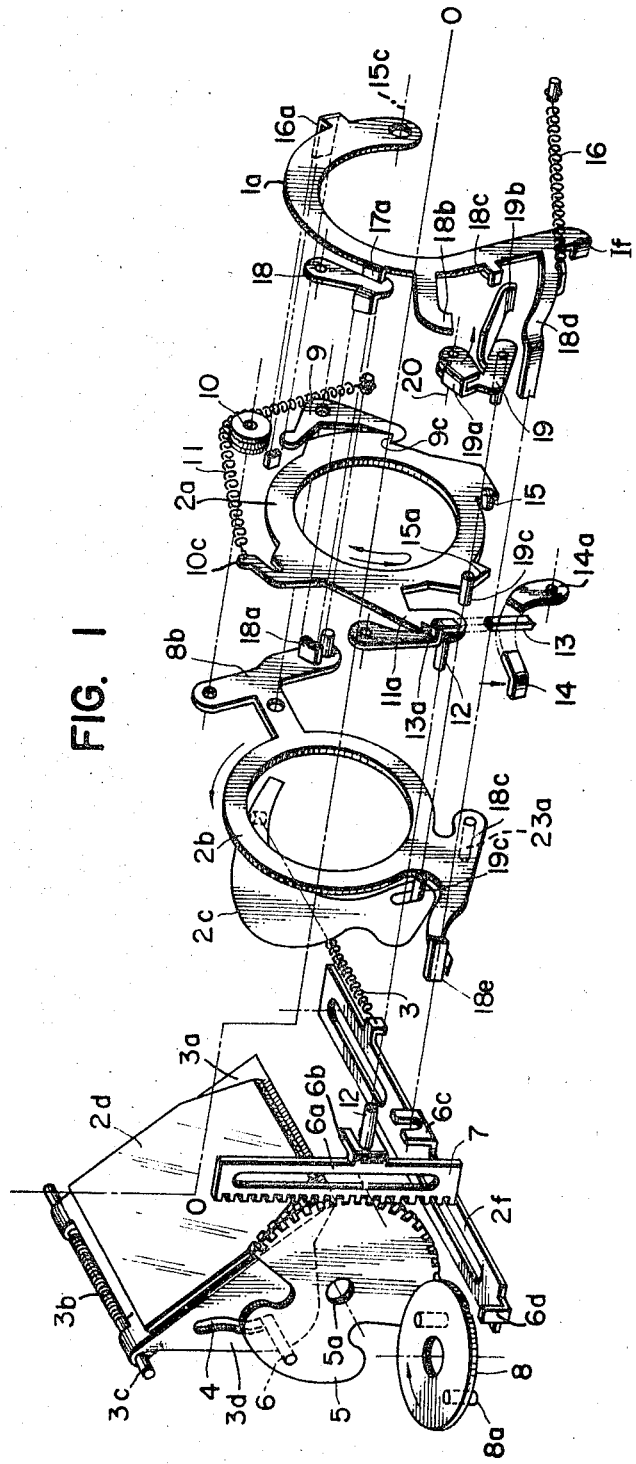
FIG. 1 is a perspective view of a lens shutter device for use with a single-lens reflex camera, illustrating moveable constituent elements dissembled in the direction of the optical axis of the photographic lens.

The invention will now be described in further detail by way of example with reference to the accompanying drawings. The camera body, which is not shown in the drawings, is preferably shaped such that the cross-sectional surface thereof takes a convex form so as to facilitate holding the camera body in the hands at both sides of the camera body. The front surface of the extended portion of said body being provided with a lens-mounting portion and the chamber of said extended portion being provided with a behind-the-lens shutter mechanism which is coupled with a movable reflecting mirror provided in a camera box therebehind.

Within the camera body, slightly behind the lens mount opening, is provided, suitably fixed coaxially with the optical axis of the lens as shown in FIG. 5, a baseplate 1. Mounted on the surface of said baseplate is a shutter-operating arm lever 1a shown in the extreme right of FIG. 1, which is fixed, at one end, to the baseplate by a stepped stud and disposed such that the inside edge of a curved portion of said lever surrounds approximately half of the periphery of an opening 2 adapted to allow passage of the light rays from the scene to be photographed. The main elements provided on the back surface of the shutter (the surface facing the movable reflecting mirror) of said baseplate are a shutter blades control ring 2a and a shutter-charging ring 2b which are superimposed and freely rotatable around a short barrel (not shown) provided on the same side of the baseplate and on the edge of the central opening therethrough.

Figure 2:
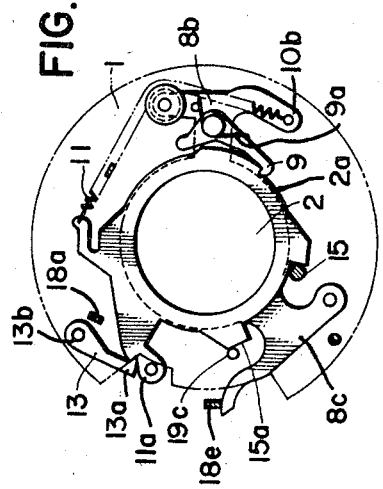
FIG. 2 is an end view of the above embodiment of FIG. 1 when viewed from the front of the camera, illustrating a portion of and mounted on the back surface of a disc or baseplate which is secured to the camera body, the baseplate being shown in dot-dash lines.

FIGS. 2 and 4 are plan views of the above rings 2a and 2b and other movable parts mounted on the rear surface of the baseplate, showing their relative positions.

Behind said ring 2b are provided shutter blades 2c of a known type comprising a pair of curved plates, behind which is provided a movable reflecting mirror 2d which reflects an image formed by the camera lens on a focusing plate 2e at a suitable distance. At the lower front of a chamber in the camera body incorporating said mirror 2d is provided, extending in a direction to the optical axis 0—0 of the photographic lens, a slidable shutter-charging lever 2f which is biased in a lengthwise direction (to the right in FIG. 1) by a tension spring 3. Other elements shown in FIG. 1 are those which operationally connect the above-mentioned main elements 1a to 2c and the mirror 2d, which are hereinafter described in further details.

In the single-lens reflex camera as shown in the drawings, a diaphragm is provided immediately behind the shutter blades 2c so as to suitably control the lens opening manually or by means of a coupled exposure meter. Since, however, such a diaphragm mechanism is not part of the present invention, description of such mechanism is omitted herein for simplicity.

A mirror-holding plate 3a shown in the extreme left of FIG. 1 is urged to swing down by the force of a spring 3b rolled on a pivot axis 3c, whereby the mirror is normally held in a 45° tilted position from the optical axis of the lens. The mirror-holding plate is bent at right angles at one side 3d where a cam slot 4 is provided. Between the sidewall formed by the bent portion 3d of the mirror-holding plate and the wall of the camera chamber in the camera body is axially supported a sector gear 5 rotatable about center 5a on the inner surface of which is planted a pin 6 which fits in the aforesaid cam slot 4. Meshed with said sector gear is a rack 6a which is slidable in a perpendicular direction relative to the camera box, said rack further having integral therewith at a side edge a bifurcated extension 6b projecting at an angle. The aforesaid shutter-charging lever 2b also carries an angularly bent bifurcated extension 6c extending upward from a side edge and at one end thereof, an integrally formed abutment 6d which is positioned in the rotary path of a pin 8a extending from the lower surface of a rotatable plate 8 which is coupled with a film-winding member (not shown). Each time the film is wound by a length corresponding to one frame of a picture, the pin 8a comes into engagement with abutment 6d, thereby sliding the lever 2f to the left in FIG. 1 against the force of the spring 3.

The shutter-charging ring 2b carries two arm levers 8b and 8c which are formed integral therewith. On a stud extending from one end of the lever 8b is pivoted a link 9 which is urged by spring 9a to rotate in a clockwise direction (as seen in FIG. 2) around said stud. One end of said link is formed into a hook portion 9b engageable with a notched step portion 9c formed on one portion of the periphery of the shutter blade control ring 2a, so as to restrain said ring 2a from clockwise rotation (in FIG. 3). Furthermore, a stud 9d extending from the other end of the lever 8b is loosely fitted with a pulley 10 over the groove of which is extended a contractable spring 11 which is fixed at one end to arm 10b of the lever 8b and at the other end to an extension 10c formed on one portion of the periphery of the ring 2a.

When the hook portion 9b of the link 9 is engaged with the step 9c of the ring 2a, both rings 2a and 2b are integrated in the rotary direction around the optical axis 0—0 through spring 11. Adjacent to the extension 10c is extended a lever 11a which carries a pin 12 which extends parallel to the optical axis 0—0 and fits in the bent bifurcated extension 6b of the rack 7. The lever 11a is further provided, on one portion of the side edge, with a notch 13c which is engageable with a hook 13a formed on the side edge of an oscillating lever 13 pivoted at its base 13b on the stationary portion of the camera. The oscillating lever 13 is offset in the middle with a step such that half of the free end side of the lever can be positioned on the front side of the baseplate 1 through the notch portion shown in FIG. 5 on the periphery of the latter The lever 13 is urged to rotate in a counterclockwise direction (in FIG. 2) around its base pivotal axis by the force of a spring (not shown). Inside the oscillating lever 13 is provided a bellcrank lever 14 whose base 14a is pivotally mounted on the camera body, the free end of said lever 13 being normally lightly pressed by its spring on the lever 14. Upon pressing the shutter-release button, the lever 14, which is coupled with such shutter-release movement, is rotated in the direction indicated by the arrow in FIG. 1, whereby the hook 13a provided on the side edge of the lever 13 is adapted to disengage from the notch provided on the extension 11a on the periphery of the ring 2a. Adjacent to said extension 11a, and integrally formed on the periphery of the ring 2a are two steps 14b and 14c between which is positioned a pin 15 attached to the camera body, whereby the rotary range of the ring 2a is restricted. The periphery of the protuberance 15a forms a cam edge 15b which is adapted to cooperate with a pin 19c as hereinafter described. The shutter-operating lever 1a shown in FIG. 1, which is urged to rotate in a counterclockwise direction (as seen in FIG. 5) around its pivotal axis 15c by the force of a tension spring 16, carries a bent extension 16a which, as shown in FIG. 5, pierces through an opening 17 and extends, at its end, to a position outside of an arm of the link 9 (FIG. 4) whose fulcrum is pivoted on the ring 2b (FIG. 3). The other bent extension 17a provided on the outer edge of the lever 1a is urged to rotate, by the force of a spring not shown, in a counterclockwise direction around its pivotal axis shown in FIG. 1 so as to be engageable with a hook of the lever 18 whose base is pivoted on the camera body. The bent extension 18a provided on the side edge of the free end of the lever 18 extends such that it takes a position in the rotary path of the aforesaid extension 10c (FIG. 3). The curved lever 1a further has extensions 18b, 18c and 18d, and extreme end of 18b being slightly bent towards extension 18c which, in turn, is bent towards ring 2a, the extreme end of the extension 18d extending to the inner edge of an arm of the dual arm lever 8c.

In the vicinity of said extension 18c is provided, in relation to the oscillatory movement of said lever 1a, an intermediary transmitting element 19 (FIG. 6) adapted to open and close the shutter blades 2c. The element 19 is an oscillating element with its oscillatory center pivoted on an axis 20 (FIG. 1) which is suitably positioned on the camera body, said element being urged to rotate in the direction indicated by the arrow around the axis 20 by the force of a spring 20a which is wrapped around axis 20. One end of spring 20a bears against a fixed part 20b of the camera and the other against transmitting element 19. The element 19 further carries, extending perpendicular to the plane in which oscillating movement occurs, extensions 19a and 19b which are formed integral with said element, 19a being adapted to be positioned to strike against extension 18b of the curved lever 1a, and against 18c. A pin 19c which extends backward from the element 19 is loosely fitted with a common opening formed by the overlaid slots of 19d and 19e the shutter blades 2c which are pivoted, at their base portions, on suitable parts of the camera body, the pin 19c being controlled by a cam edge forming the frame of an extended edge 15a provided on the periphery of the ring 2a.

The actual operation of the present invention will now be explained in connection with the embodiment shown in the drawings. FIG. 1 represents relative positions of the various movable elements when the film loaded in the camera is wound, coupled with which movement disc 8 is rotated through a predetermined angle in the direction indicated by the arrow, whereupon the lever 2f is drawn towards the left (in FIG. 1) in the longitudinal direction by the pin 8a. This motion expands and charges spring 3 connected therewith.

In this situation, the pin 19c which opens and closes the shutter blades 2c mounted on the periphery of the protuberance 15a of the ring 2a as shown in FIG. 4, which opens the shutter blades to the fullest extent, causing the light rays coming from the photographic lens (not shown) to pass through the opened shutter and be reflected on the mirror 2d which is in the lower position, so as to form an image to be photographed on the focusing plate.

When the bellcrank lever 14, which is shown beneath the ring 2a of FIG. 1 and is adapted to be moved by the depression of a shutter-release button which extends outside of the camera body, is depressed in the direction of the arrow indicated in FIG. 1 or FIG. 5, the lever 13 is caused to rotate clockwise (as shown in FIG. 5) from its normal position, whereby its hook 13a is disengaged from notch 13c provided on the extension 11a of the ring 2a. This, in turn, causes, on one hand, the shutter-charging lever 2f to make the return sliding movement under the pull of spring 3, and on the other, the rings 2a and 2b to integrally rotate around the optical axis 0—0 in a counter clockwise direction as seen in FIG. 1, the rotary movement of the ring 2b being made integral with that of the ring 2a by means of the return sliding movement of the shutter-charging lever 2f having been stopped by a pin fixed on one arm of the dual arm lever 8c of the lever 2b fitting in the bent bifurcated extension 6c of the lever2f. FIG. 3 shows the status of the rings 2a and 2b immediately after their counterclockwise rotation.

As the ring 2a rotates from a position shown in FIG. 2 to a position shown in FIG. 3, the pin 19c slides from the top portion of the protuberance 15a down the slant cam edge 15b thereof, causing the shutter blades 2c to close. As the shutter blades control ring 2a rotates, the pin 12 fixed on the extension 11a moves the rack 7 downward, causing the pin 6 on the sector gear 5 which is meshed with said rack 7 to swing up the mirror 2d in cooperation with the slot 4.

Counterclockwise rotation of the ring 2a causes the extension 10c of said ring 2a to strike against the bent extension 18a of the lever 18, thereby releasing the engagement between the hook of the lever 18 and the extension 17a of the curved shutter-operating arm lever 1a (FIG. 5) whereupon the curved lever 1a makes a counterclockwise rotation by force of a spring 16 as shown in FIG. 1. This causes, as evident from FIGS. 5 and 6, the extension 18c of the lever 1a to strike against the extension 19b of the element 19, whereby the pin 19c fixed on said element 19 is caused to open the shutter blades 2c to the fullest extent to allow light exposure for picture taking. Incidentally, at the initial stage of the counterclockwise rotation of the ring 2a, namely, while the shutter blades 2c remain closed, the opening of the diaphragm (not shown) is adapted to be controlled to a suitable degree by an exposure meter coupled therewith, although this is not directly or inseparatably related with the present invention operationwise. One example of such automatic diaphragm device is described in the specification of the Japanese Utility Model No. Sho 41–95205 applied for on Oct. 13, 1966. Needless to mention, however, inasmuch as the diaphragm opening is closely related with the shutter exposure time which is determined prior to photographic operation, the shutter exposure time is so designed as to be determined from outside of the camera body. For such shutter exposure time control, a normal governor gear train well known in the art can be used. In the embodiment shown in FIG. 5, a known gear train is mounted on the baseplate, with the end lever of the first sector gear 21 connected with an oscillating lever 22 which carries a cam edge at its lateral side, so that, when the curved arm lever 1a makes an oscillating movement, its free end 22a pushes the cam edge of the lever 22 which is thereby caused to be oscillated, whereby the shutter exposure time is delayed. Under this situation, by determining the position of the lever 22 relative to the baseplate, a desired exposure time is obtainable. The rotary movement of the ring 2b which rotates integrally with the ring 2a is limited by a stop 23 as shown in FIG. 4.

As the extension 18c slides over the edge of the extension 19b of the element 19 as a result of continued counter-clockwise rotation shown in FIG. 1, the extension 18b comes in contact with the extension 19a of the element 19, whereby the element 19 rotates in the opposite direction as indicated by the arrow in FIG. 1, causing the shutter blades to close, thereby completing the exposure operation. Towards the end of this movement, counterclockwise rotation of the ring 2b is stopped by a stop 23 as shown in FIG. 4.

The extension 16a of the curved shutter-operating arm lever 1a then strikes against the end of the lever 9, thereby releasing the engagement between hook portion 9b of the lever 9 and the step 9c on the periphery of the ring 2a. In this instance, the ring 2b is not in a position to rotate integrally with the ring 2a because a pin 23a provided on the ring 2b is fitted in the bifurcated extension 6c of the shutter-charging lever 2f which has made a return sliding movement to the right in FIG. 1 by the contracting force of the spring 3, causing the ring 2a alone to make a clockwise rotation around the optical axis 0—0 in FIG. 1 under the pull of the contractable spring 11, the rotary movement of ring 2a being limited by a stop 15. Concurrent with the clockwise return movement of the ring 2a, the rack 7 is raised by a pin 12 on said ring 2a, which, in turn, moves the mirror 2d downward by means of the gear 5 and the pin 6 thereon. The pin 19c which cooperates with the shutter blades 2c overrides the protuberance 15a of the ring 2a, thereby opening the shutter blades to the fullest extent. Then hook 13a of the lever 13 comes in engagement with notch 13c of the lever 11a of the ring 2a, whereby all the elements return to their original positions as shown in FIG. 1.

As evident from the above description, a shutter mechanism, which is consisted of such main parts as 1a, 2a, 2b, and 2c, and other movable elements which connect said main parts operationally, can be assembled in a slim unit in the direction of the optical axis 0—0 by mounting the parts on both sides of the baseplate 1 as shown in FIGS. 2 and 5. Inasmuch as an automatic diaphragm mechanism, which is adapted to be coupled with an exposure meter built in the camera body, does not take space in the direction of the optical direction of the photographic lens, incorporation of the above shutter mechanism together with the automatic diaphragm mechanism immediately behind the lens-mounting portion of the camera body of a single-lens reflex camera housing the movable reflecting mirror, becomes easy from the standpoint of designing. This enables realization of a compact single-lens reflex camera with convertible lenses and a behind-the-lens shutter mechanism, which has never been successfully developed prior to this invention.

What is claimed is:

1. In a single-lens reflex camera with a pivoted reflecting mirror and a lens holder, both lined up on the optical axis of the camera, a shutter-operating device comprising:

a baseplate surrounding the optical axis, a shutter-operating arm lever mounted on the base-plate on the side near the front of the camera surrounding the optical axis thereof, a shutter blade control ring mounted on the base-plate near the back of the camera, said shutter blade control ring and baseplate surrounding the optical axis of said camera, a shutter-charging ring also surrounding said optical axis in front of said shutter blades and behind said shutter blade control ring, said baseplate serving to support said shutter-operating arm lever and said shutter blades control ring while at the same time permitting control elements to pass therethrough, a shutter blades control pin cooperating with said shutter-operating arm lever, said shutter blades control ring, and said shutter blades to operate said blades in response to movement of the shutter-operating arm lever and the shutter blades control ring in controlling the light passing through the lens in the direction of said mirror, means connecting said shutter blades control ring with said mirror, said connecting means comprising a pin mounted on said shutter blades control ring and extending toward said mirror, and positioning means for pivoting said mirror, said positioning means comprising a holding plate for said mirror, a slot formed in said holding plate, a rotatable gear having a projecting pin extending therefrom for positioning in said slot, and a rack positioned adjacent to said mirror and cooperatively engaged with said gear, said connecting means pin engageable with said rack whereby rotation of said shutter blades control ring effects rack and gear movement thereby providing the pivoting of said mirror, said lens, shutter-operating arm lever, shutter blades control ring, and shutter-charging ring each having a central opening adapted to permit light rays which pass through said lens to travel along the central axis of the camera to said mirror.

2. In a camera having a lens in a lens barrel, a mirror movable between an operative position in the optical axis of the lens and an inoperative position remote from said optical axis, a shutter between the lens and the mirror when said mirror is in the operative position, a shutter-charging slide movable upon winding of the camera film from an uncocked to a cocked position, resilient means biasing the shutter-charging slide from the cocked into the uncocked position, release means movable to initiate an exposure of film in the camera, and shutter-timing means for regulating the speed of motion of a timing element in accordance with a desired shutter speed, the improvement comprising:

a. a shutter-charging ring rotatably mounted around the lens barrel;

b. means connecting the shutter-charging ring to the shutter-charging slide for rotating the shutter-charging ring about the lens axis in a clockwise direction from an uncocked to a cocked position as the shutter-charging slide moves from the uncocked to the cocked positions;

c. a shutter blades control ring mounted around the lens barrel and rotatable therearound from a cocked to an uncocked position;

d. resilient means extending between the shutter-charging ring and the shutter blades control ring for biasing the latter in a clockwise direction relative to the former;

e. releasable ring-connecting means for connecting, when in operative position, the shutter-charging ring and the shutter blades control ring when said rings are in a cocked position relative to each other;

f. releasable shutter blades control ring-holding means for holding the shutter blades control ring in a cocked position in which said ring is rotated clockwise and for releasing the shutter blades control ring in response to movement of the release means;

g. a shutter-operating arm lever pivoted for movement between a cocked and an uncocked position about an axis parallel to the optical axis of the lens;

h. means connecting the shutter-operating arm lever to the shutter-timing means for controlling the speed of movement of the former in accordance with the speed of movement of the latter;

i. shutter-operating arm lever-cocking means for moving the shutter-operating arm lever from an uncocked to a cocked position and holding it in said cocked position in response to movement of the shutter-charging ring from the uncocked to the cocked position;

j. resilient means biasing the shutter-operating arm lever into the uncocked position from the cocked position;

k. latch means for holding, when in operative position, the shutter-operating arm lever in the cocked position;

l. shutter control means for controlling the shutter opening, said shutter control means being movable between an open position in which the shutter is held open and a closed position in which the shutter is held closed;

m. means for moving the shutter control means into the open position and holding it in said position when the shutter blades control ring is in the cocked position;

n. means for moving the shutter control means into the closed position when the shutter blades control ring moves out of the cocked position;

o. means for moving the latch means from the operative position upon movement of the shutter blades control ring into a selected position intermediate the cocked and the uncocked position of said ring, whereby release of the shutter-operating arm lever is effected;

p. means for moving the shutter control means into the open position from the closed position as the shutter-operating arm lever reaches a first preselected position in motion between the cocked and the uncocked positions thereof;

q. means for moving the shutter control means into the closed position as the shutter-operating arm lever reaches a second preselected position in motion between the first preselected position and the uncocked position thereof;

r. means for moving the ring-connecting means out of the operative position when the shutter-operating arm lever reaches a third preselected position in motion between the second preselected position and the uncocked position thereof, thereby allowing clockwise rotation of the shutter blades control ring relative to the shutter-charging ring; and s. means for moving the mirror to the inoperative position upon motion of the shutter blades control ring into the uncocked position and into the operative position upon motion of the shutter blades control ring into the cocked position.

3. In a camera having a lens in a lens barrel, a mirror movable between an operative position in the optical axis of the lens and an inoperative position remote from said optical axis, a shutter between the lens and the mirror when said mirror is in the operative position, release means movable to initiate an exposure of film in the camera and shutter-timing means for regulating the speed of motion of a timing element in accordance with a desired shutter speed, the improvement comprising:

a. a shutter-charging slide movable in a direction transverse to the optical axis of the lens from an uncocked to a cocked position upon winding of the camera film;

b. first resilient means for biasing the shutter-charging slide from the cocked to the uncocked position and for receiving and storing energy when the shutter-charging slide moves from the uncocked to the cocked position;

c. a shutter-charging ring rotatably mounted around the optical axis of the lens ahead of the mirror and movable in a clockwise direction from an uncocked to a cocked position;

d. a first projection extending from the shutter-charging ring in the direction of the optical axis;

e. means on the shutter-charging slide for engaging the first projection and moving said first projection in response to movement of the shutter-charging slide, whereby the shutter-charging ring is rotated clockwise from an uncocked to a cocked position when the shutter-charging slide moves from the uncocked to the cocked position thereof and whereby the first resilient means, acting through the shutter-charging slide, exerts a force on the shutter-charging ring tending to rotate said ring in the counterclockwise direction;

f. a shutter blades control ring rotatably mounted about the optical axis ahead of the shutter-charging ring and movable in a counterclockwise direction from an uncocked to a cocked position;

g. second resilient means extending between the shutter-charging ring and the shutter blades control ring for biasing the latter in a clockwise direction relative to the former and for receiving and storing energy when the shutter-charging ring rotates clockwise relative to the shutter blades control ring from an uncocked to a cocked position;

h. a pivoted ring-connecting latch means movable between an operative and an inoperative position, said ring-connecting latch when in the operative position locking the shutter blades control ring to the shutter-charging ring with the former rotated into a cocked position in a counterclockwise direction relative to the latter, said ring-connecting latch being movable with the shutter blades control ring and the shutter-charging ring when said rings rotate together with the latch in operative position;

i. a baseplate ring fixedly mounted about the optical axis ahead of the shutter blades control ring;

j. shutter blades control ring latch means pivoted to the baseplate ring and movable between an operative and an inoperative position for engaging and holding, when in the operative position, the shutter blades control ring in a cocked position in which said ring is rotated clockwise, said shutter blades control ring latch means being movable from the operative to inoperative position in response to movement of the release means;

k. a shutter-operating arm lever pivotally mounted on the baseplate ring for rotation between uncocked and cocked positions about an axis perpendicular to said ring;

l. means connecting the shutter-operating arm lever to the shutter-timing means for controlling the speed of movement of the former in accordance with the speed of movement of the latter by impeding the rotation of the shutter-operating arm from the cocked to the uncocked position;

m. a cocking extension on the shutter-operating arm lever;

n. abutment means on the shutter-charging ring for engaging the cocking extension during clockwise rotation of said ring and thereby rotating the shutter operating arm lever from the uncocked to the cocked position;

o. third resilient means extending between the baseplate and the shutter-operating arm lever for biasing the latter in a counterclockwise direction relative to the former and for receiving and storing energy when the shutter-operating arm moves from the uncocked to the cocked position;

p. shutter-operating arm latch means pivotally mounted on the baseplate ring and movable between an operative and an inoperative position, said means when in the operative position locking the shutter-operating arm in the cocked position;

q. shutter control means rotatable between an open and a closed position for opening and closing the shutter;

r. abutment means on the shutter blades control ring for contacting the shutter control means when said ring moves into the cocked position and holding the shutter control means in the open position while said ring is in the cocked position;

s. means for moving the shutter control means into the closed position when the shutter blades control means into the closed position when the shutter blades control ring moves out of the cocked position;

t. an unlatching abutment on the shutter blades control ring placed to strike the shutter-operating arm latch means and move said latch means to the inoperative position when said ring reaches a selected position intermediate the cocked and the uncocked position of said ring, whereby release of the shutter-operating arm lever is effected;

u. an opening abutment on the shutter-operating arm lever placed to contact the shutter control means and move said means into the open position when said lever reaches a first preselected position in motion between the cocked and the uncocked positions thereof;

v. a closing abutment on the shutter-operating arm lever placed to contact the shutter control means and move said means into the closed position when said lever reaches a second preselected position in motion between the first preselected position and the uncocked position thereof;

w. an extension on the shutter-operating arm lever placed to contact the ring-connecting latch means and move said means into the inoperative position when the shutter-operating arm lever reaches a third preselected position in motion between the second preselected position and the uncocked position, thereby allowing clockwise rotation of the shutter blades control ring relative to the shutter-charging ring; and x. means for moving the mirror to the inoperative position upon motion of the shutter blades control ring into the uncocked position and into the operative position upon motion of the shutter blades control ring into the cocked position.

* * * * *